United States Patent

[11] 3,572,547

[72] Inventor: Maynard E. Walberg, Waukesha, Wis.
[21] Appl. No.: 843,544
[22] Filed: July 22, 1969
[45] Patented: Mar. 30, 1971
[73] Assignee: Allis-Chalmers Manufacturing Company, Milwaukee, Wis.

[54] PLATELESS PLANTER
10 Claims, 7 Drawing Figs.

[52] U.S. Cl. .............................................. 221/220, 221/260, 221/277, 222/407, 111/77
[51] Int. Cl. ....................................................... A01c 7/08
[50] Field of Search ............................................. 221/203, 220, 260, 277; 222/407; 111/77

[56] References Cited
UNITED STATES PATENTS
| | | | |
|---|---|---|---|
| 1,371,343 | 3/1921 | Bow | 222/407X |
| 1,908,085 | 5/1933 | Udvary et al. | 221/277 |

Primary Examiner—Lloyd L. King
Assistant Examiner—Michael I. Mar
Attorneys—Kenneth C. McKivett, Charles L. Schwab and Robert B. Benson ABSTRACT: A plateless planter wherein rotating fingers pick up seeds, move them in a groove in the periphery of a drum surrounding the fingers to a point where the groove is interrupted with depressions so that excess seed can drop out and return to the seed supply while the singulated seed is moved along the groove by the finger to a point of discharge.

Patented March 30, 1971
3,572,547
2 Sheets-Sheet 1
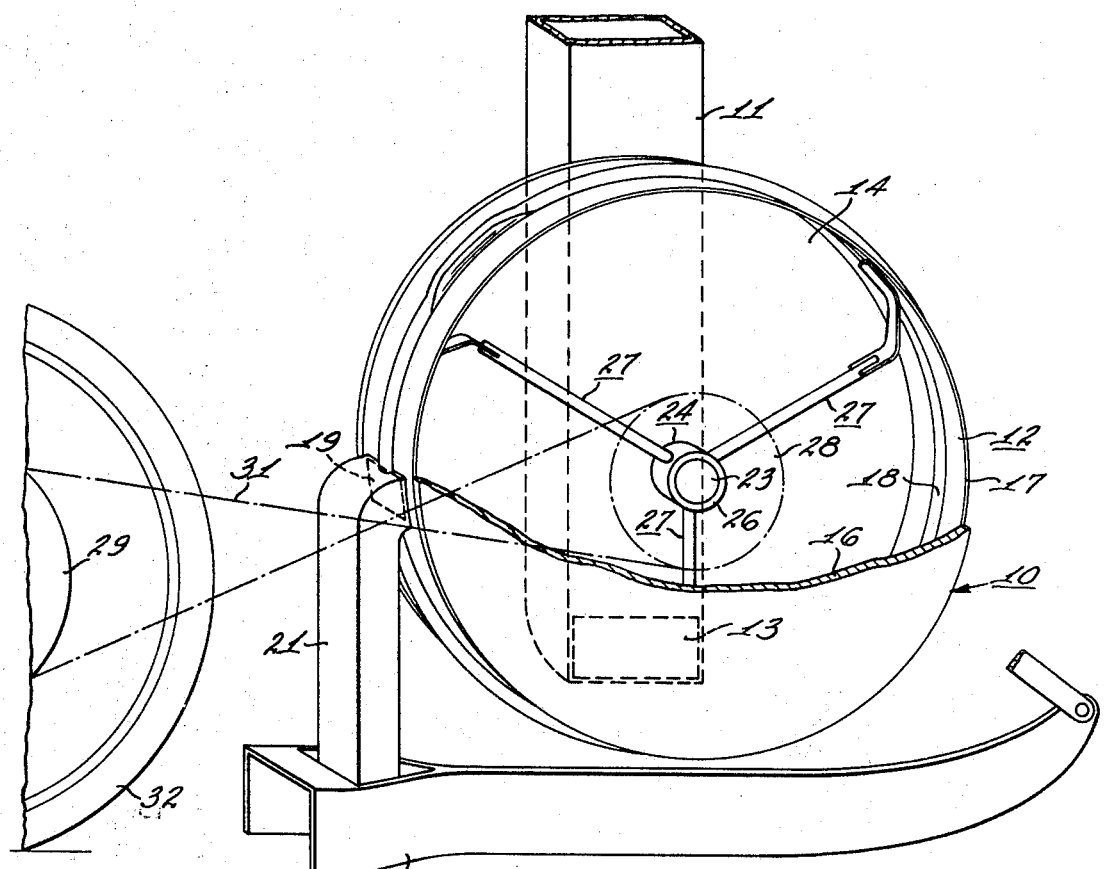
Fig.-1
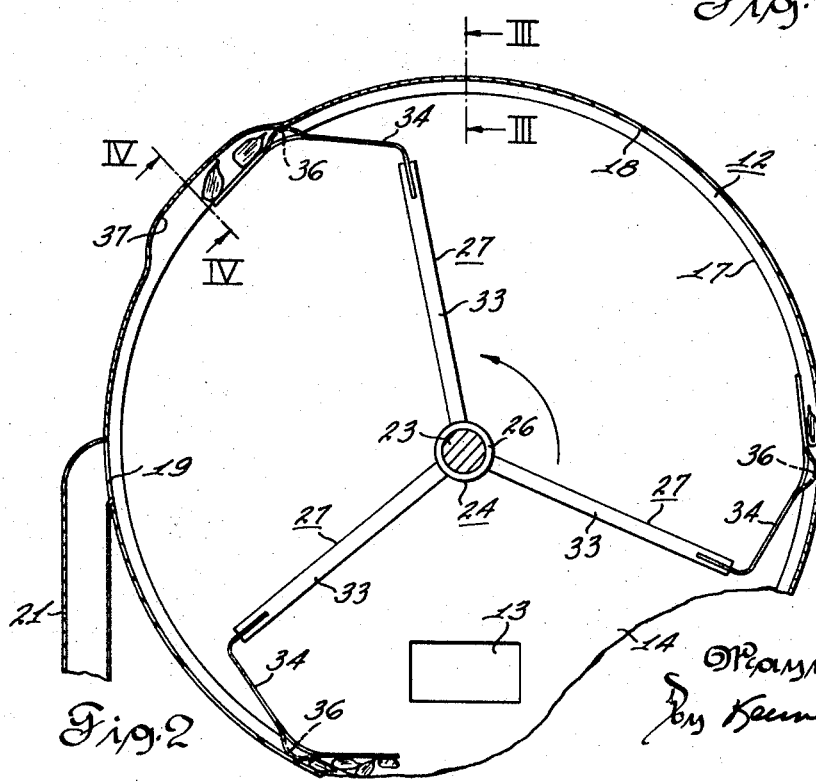
Fig.2
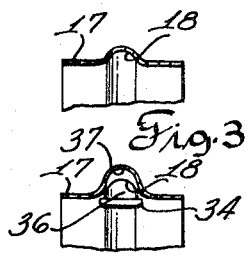
Fig.3
Fig.4
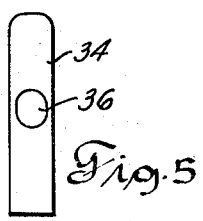
Fig.5
Inventor
Maynard E. Walberg
By Kenneth Duckett
Attorney Patented March 30, 1971 3,572,547

PLATELESS PLANTER

This invention relates to a new and improved seed planter of the type intended to be attached to the usual tractor and which will deposit seeds into a furrow formed in the ground.

An object of this invention is to provide a seed planter which will deposit single seeds into the ground at a desired distance apart and wherein the distance between seeds can be controlled at the will of the operator.

Another object of this invention is to provide a seed planter which will eliminate skipping during the depositing of seeds and will also eliminate the depositing of doubles.

Another object of this invention is to provide a seed planter which comprises a single compact unit.

A further object of this invention is to provide a high-speed planter which is capable of accomplishing the aforementioned objects at the high rate of speed required by modern farming.

A further object of this invention is to provide a planter which is capable of planting a variety of seeds, seed sizes and shapes without the need of changing parts therein.

A further object of this invention is to provide a seed singulator narrow enough to follow double disc openers.

A further object of this invention is to provide a seed planter of few moving parts.

These and other objects of the present invention are set forth in greater detail in the following description having reference to the attached drawings wherein an illustrative embodiment of the invention is shown.

FIG. 1 is a an isometric view of a planter embodying the invention with some parts removed for clarity of illustration;

FIG. 2 is an enlarged side elevation of a portion of the planter shown in FIG. 1 with a side removed;

FIG. 3 is a section view taken on line III–III of FIG. 2;

FIG. 4 is a section view taken on line IV–IV of FIG. 2;

FIG. 5 is a side elevation of one of the seed fingers shown in FIG. 2;

Figure 6:
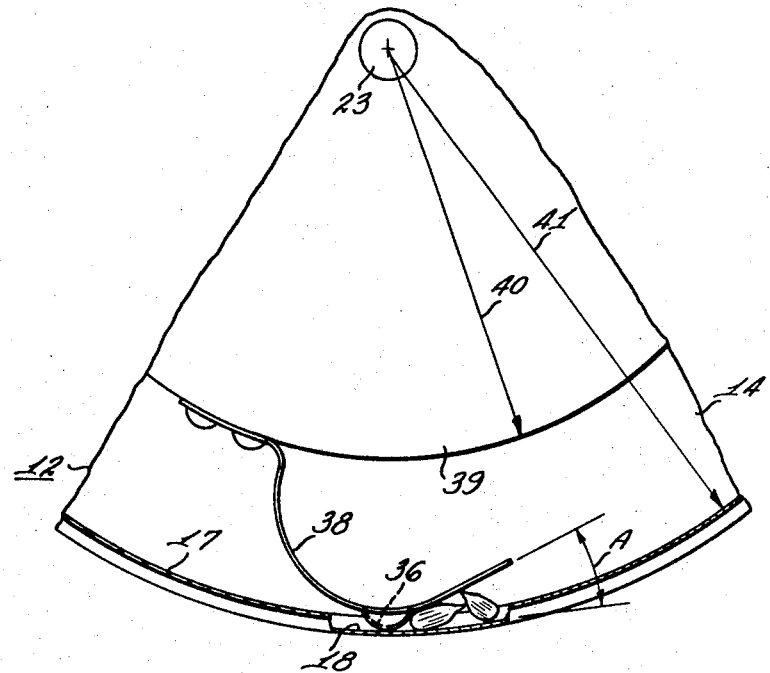
FIG. 6 is an enlarged side elevation view similar to FIG. 2 showing an alternative embodiment of the invention with the seed finger in pickup position.

The reference character 10 designates the planter unit as a whole. Referring to FIG. 1, the planter 10 includes a conventional hopper (not shown) having a depending portion 11 for providing a seed passage to a circular housing or drum 12 through opening 13 in back member 14 thereof. Seeds from the hopper descending through tube 11 will control seed height in the drum to substantially the same as the upper edge of opening 13. Drum 12 is provided with another opposed front member 16 together with circumferential band 17 forming the drum 12. Band 17 is provided with a peripheral groove 18 therein as shown in FIG. 3. Groove 18 is provided with an opening 19 forming a seed passage from groove 18 to discharge tube 21. Discharge tube 21 is attached at its upper end to drum 12 and at its lower end to furrow opener 22 so that seeds deposited in tube 21 will drop into a furrow opened by furrow opener as the planter moves along a field being planted. Multiple grooves and multiple rows of fingers may be used to increase the capacity of the planter.

A shaft 23 is journaled in sidewalls 14 and 16 and in turn has attached thereto a rotor structure 24 positioned between walls 14 and 16. Rotor structure 24 includes a hub portion 26 to which are attached a number of seed fingers 27. As shown in FIG. 2, three fingers are attached and ordinarily many more would be used and this would not alter the essence of this invention. Shaft 23 is eccentrically mounted in plates 16 and 14 so that fingers 27 will bear harder against band 17 at the lower portion thereof for a purpose to be discussed later.

Rotor structure 24 has a pulley 18 attached to shaft 23 at a point outside of drum 12. Pulley 28 is driven by pulley 29 through belt 31. Pulley 29 is attached to ground wheel 32 for movement therewith. If desired, pulley 28 may be driven by any desired means not necessarily a belt, such as a chain or even gears.

The shank portion 33 of fingers 27 is low carbon steel whereas the distal portion 34 of fingers 27 is spring steel. Portions 34 is provided with a hemispherical indentation 36 (see FIG. 2) which is complimentary to the groove 18 in band 17 so that as finger 27 is rotated indentation 36 fits into groove 18. The direction of rotation is as shown by the arrow in FIG. 2. Groove 18 is provided with a deepened portion 37 for the purpose of singulating seeds.

Referring to the embodiment shown in FIG. 6, seed fingers 38 are attached to the periphery of disc 39 for rotation therewith. Conventional means can be used for such attachment disc 39 is mounted on shaft 23 for rotation therewith. Seed fingers 38 are made of spring steel so that when such fingers are in the seed pickup or lowest portion of their cycle, as shown in FIG. 6, the fingers will be biased against the inner surface of band 17 so that the fingers will assume the position shown with a relatively large angle A providing space for picking up seed. The seed fingers 38 are also provided with a hemispherical indentation 36 which is complementary to the groove 18. As shown in FIG. 6 radius 40 is the radius of disc 39. Radius 41 is the radius of drum 12 minus the eccentricity of shaft 23 relative to drum 12 which produces the aforesaid bias on spring fingers 38 when so positioned.

Figure 7:
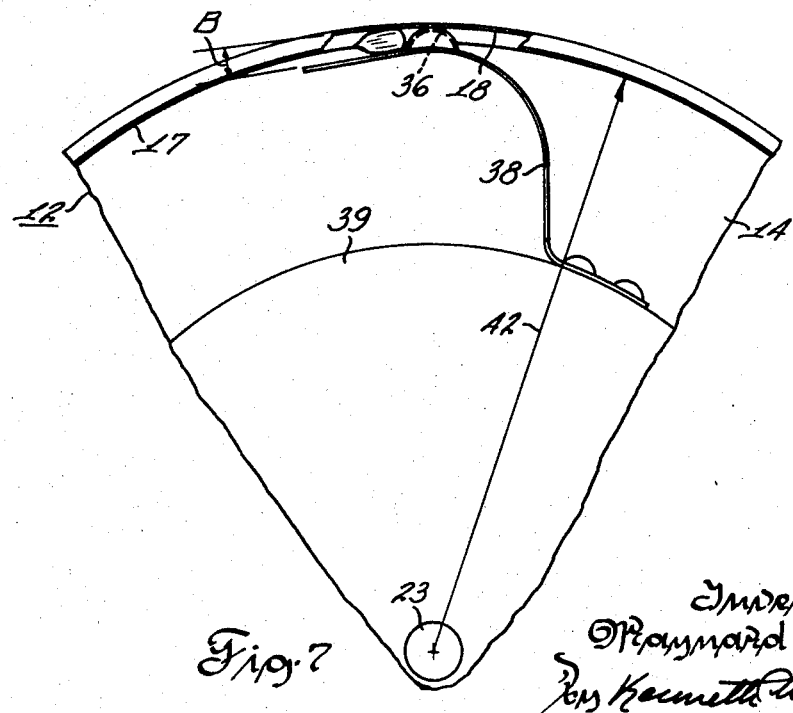
FIG. 7 is a view similar to FIG. 6 with the seed finger shown positioned adjacent the upper portion of the seed drum.

Referring to FIG. 7, it is seen that seed finger 38 is shown in the opposite position to that shown in FIG. 6 or in other words seed finger 38 is shown in its highest position wherein the seed finger has been permitted to expand or the bias therein has been reduced so that the distal portion of the finger is assuming a position substantially parallel to the inner surface of drum 12 and angle B is relatively small. Radius 42 is the radius of drum 12 plus the eccentricity of shaft 23 relative to drum 12 which provides space for finger 38 to expand to the position shown in FIG. 7.

Accordingly, it is seen that fingers 38 are provided with an aggressive bias in their lower position when picking up seed but this bias is reduced as the fingers move upwardly and this bias has been substantially reduced at the time the fingers move over portion 37 which removes any seeds in excess of one.

The operation of the planter is as follows:

As the planter 10 is drawn over a field, furrow opener 22 opens a furrow and ground wheel 32 drives sprocket 29 which in turn drives belt 31 which is drivingly connected to rotor 24 through pulley 28. Rotor 24 is driven in the direction shown by the arrow in FIG. 2. The individual seed fingers 27 rotate with their distal portion 34 leading the finger. This distal portion dips into the supply of seeds contained in drum 12 which will be filled to a level of approximately the upper edge of opening 13. Because of the eccentric relation between shaft 23 and drum 12 the fingers are pressed more firmly against the band 17 in the area of the seeds than above it. This additional pressure helps the fingers to singulate the seeds so that only one seed should be moved up by distal portion 34 from the seed supply rather than the two seeds which are shown in the deepened portion 37 in FIG. 2. As the finger leaves the seed supply with one or more seeds being moves in peripheral groove 18 ahead of indentation 36 as shown in relation to lower right-hand finger 27 in FIG. 2, the seed is moved along the peripheral groove 18 until deepened portion 37 is reached. At this point if there is more than one seed being transported by the finger, the enlargement 37 in the groove provides space for the extra seeds to drop back into the supply of seeds below. If desired more than one of these deepened pockets 37 may be used for singulating the seeds. When finger 27 reaches outlet 19 the single seed remaining in the finger and groove 18 drops into opening 19 and down through tube 21 into the furrow formed by furrow opener 22.

It is apparent that the distance between planted seeds can be varied by changing the number of fingers and by changing the speed of shaft 23 or by altering both.

I claim:

1. A seed planter comprising: a circular band having a seed discharge opening on the periphery thereof and having front and back members attached to said band for closing same, and having a seed-receiving opening at a lower portion of one of said members, a rotatable shaft journaled in said back member, at least one spring finger connected to said shaft for rotation therewith, said band having an outwardly extending groove about the periphery thereof, said finger being provided with an indented midportion fitting into said groove for guiding said finger during rotation thereof, said groove being of a depth substantially equal to the minimum dimension of a seed, said finger selecting a seed in said groove at the lower end of said band and then moving said seed along said groove by contact with said indentation and the distal end of said finger to said point of discharge.

2. The combination recited in claim 1 and wherein said indentation is provided with the same radial dimensions as said groove to provide a complimentary fit therebetween.

3. The combination recited in claim 1 and wherein said shaft is journaled in said back member eccentric to said band so that the upper portion of said shaft is spaced a greater distance away from the top of the band than the lower portion of said shaft is spaced from the bottom of said band so that bias of said spring finger is downwardly against the bottom of the band during the seed pickup portion of its cycle and is greater than the bias of said spring finger when at its highest position.

4. The combination recited in claim 3 and wherein said groove is deepened in an upper portion thereof to provide an escape route for seeds in excess of one which may have been picked up by said finger.

5. The combination recited in claim 3 and wherein the portion of said finger extending from said indentation to the distal end of said finger extends substantially parallel to the inside of said band when said finger is in its highest position and has a width substantially equal to the width of said groove.

6. The combination recited in claim 5 and wherein said shaft is rotated in a direction so that the distal end of said finger is the leading portion thereof.

7. The combination recited in claim 3 and wherein the portion of said finger extending from said indentation to the distal end of said finger is at an aggressive angle to the inside band surface of said housing when said finger is in its seed pickup portion of its cycle.

8. The combination in claim 7 and wherein the distal portion of said finger is spring steel.

9. The combination recited in claim 2 wherein said groove is semicircular in cross section and wherein said indentation in said finger is hemispherical dimensioned to be recieved in said groove in complementary relation thereto.

10. The combination recited in claim 6 and wherein a disc member attached to said shaft forms a support for a spring steel finger portion.